July 10, 1928.

E. R. POPE 1,676,283

ATTACHING MACHINE

Filed Dec. 4, 1922

INVENTOR
Elmer R. Pope
By his Attorney,

July 10, 1928.

E. R. POPE 1,676,283

ATTACHING MACHINE

Filed Dec. 4, 1922

INVENTOR
Elmer R. Pope
By his Attorney

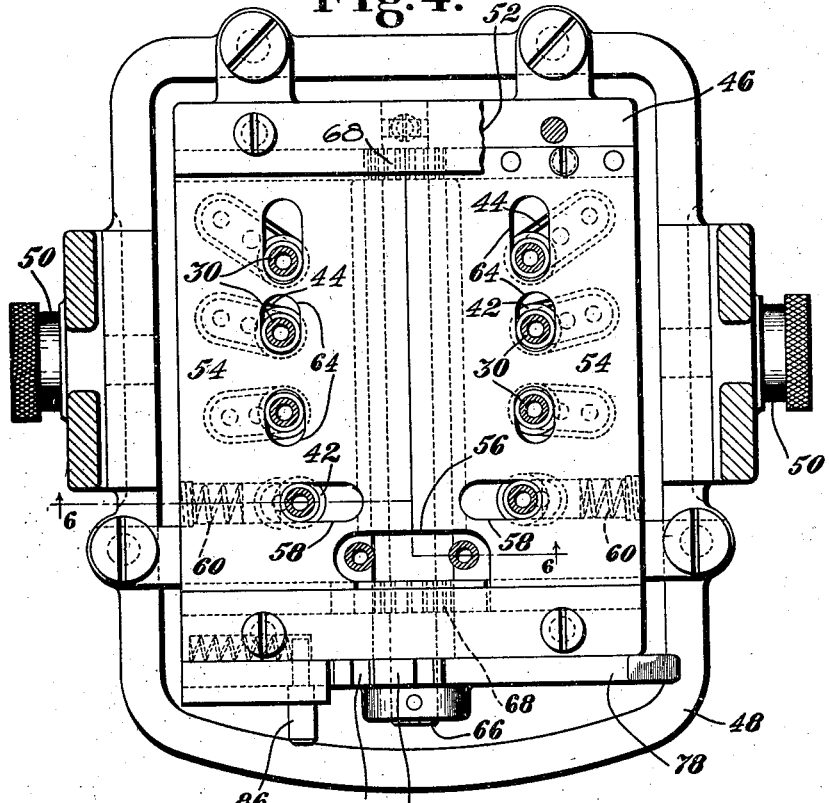
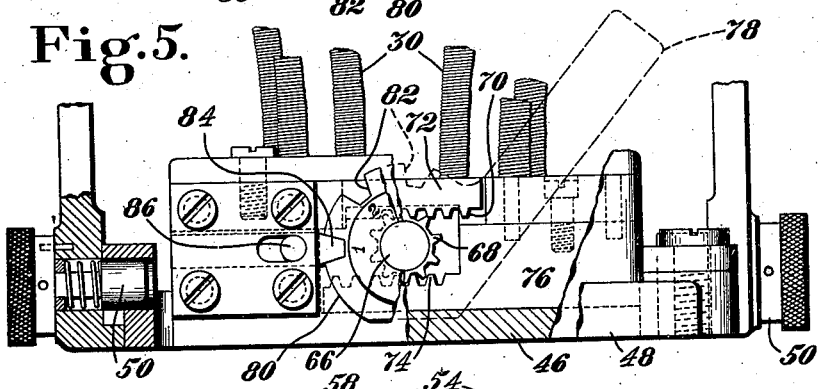
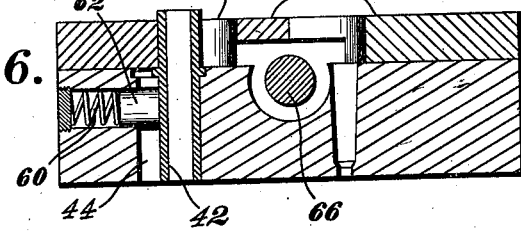

Patented July 10, 1928.

1,676,283

UNITED STATES PATENT OFFICE.

ELMER R. POPE, OF HAMILTON, MASSACHUSETTS, ASSIGNOR TO UNITED SHOE MACHINERY CORPORATION, OF PATERSON, NEW JERSEY, A CORPORATION OF NEW JERSEY.

ATTACHING MACHINE.

Application filed December 4, 1922. Serial No. 604,751.

This invention relates to attaching machines, as those for fastening together the co-operating elements of a shoe at the heel-seat, for securing a molded counter upon a turn shoe preparatory to the turning operation, or for attaching a shoe-heel.

In carrying out such operations as above indicated, various nailing designs are employed for different sizes or groups of sizes of shoes. To properly present the nails or other fasteners for driving in accordance with the particular design best fitting the size of shoe being operated upon, it is customary to use a multiple die-block containing sets of receiving openings corresponding to all the designs which the machine is to nail, and with such die-block a similar multiple loader-block is employed. When an automatic nail-distributing mechanism is applied to a machine having these multiply-equipped elements, the arrangement of the nail-tubes or conduits must be such as to correspond at all times with the design which is in use. Consequently the terminal-portions of these tubes delivering to the loader-block must be shifted from one set of nail-receiving openings to another whenever the design is altered. An object of my invention is to facilitate this shifting operation, there being provided a simple structure by which each tube or conduit is moved in the desired direction to locate it for the design to be nailed, the action upon the tubes preferably being in groups, the alteration in which is effected simultaneously. The particular conduit-positioning means herein disclosed comprises co-operating members, as a mounting or foot-plate and a movable adjusting plate, in each of which is an elongated opening to receive the terminal portion of a tube and to vary its relation by the joint action of the plate-openings as the adjusting plate is moved.

In the accompanying drawings,

Fig. 4 is a horizontal section taken just above the foot-plate;

Fig. 5 is a front elevation of the same, with parts broken away;

Fig. 6 is a vertical section on the line 6—6 of Fig. 4;

Figure 1:
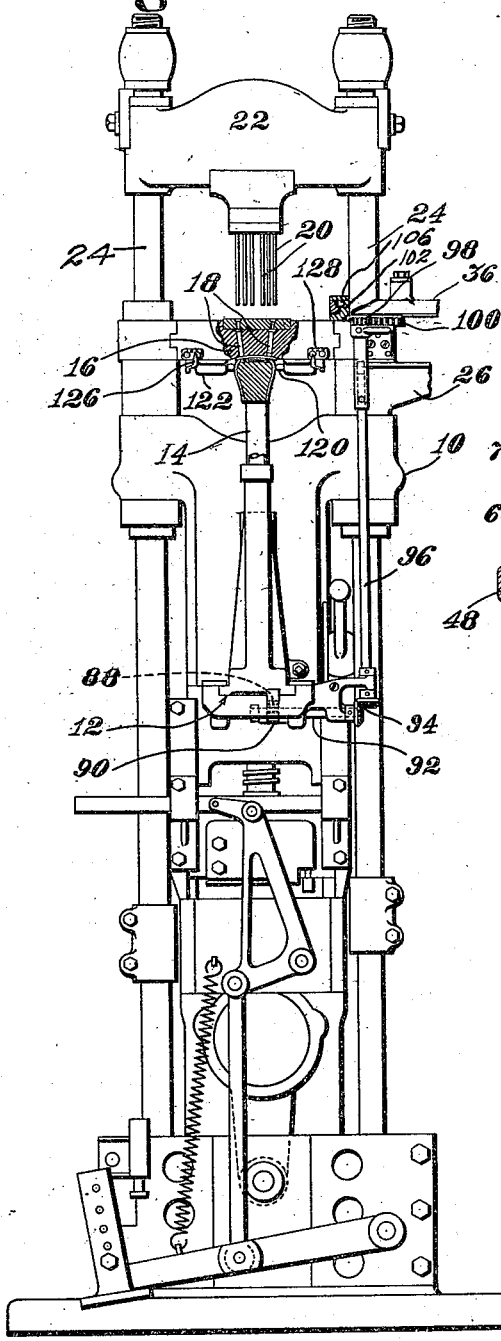
Fig. 1 shows a heel-seat-nailing machine organized in accordance with one embodiment of my invention, the distributing mechanism being omitted.
Figure 3:
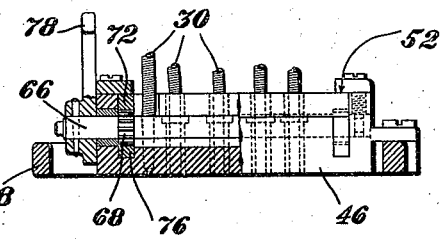
Fig. 3 is a side elevation of the foot-plate for positioning the distributor-tubes, parts being broken away.
Figure 2:
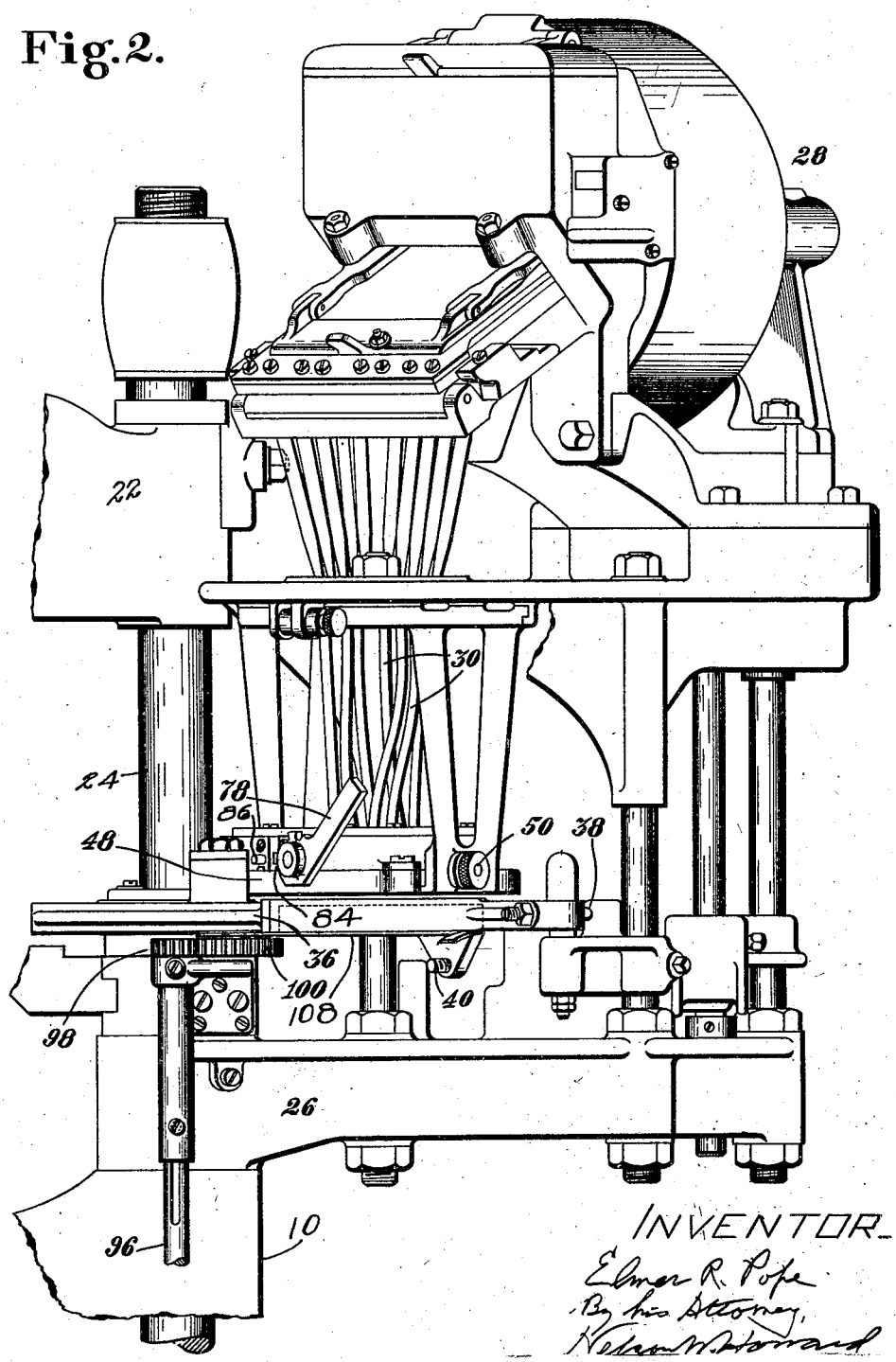
Fig. 2 is a front elevation of said distributing mechanism on an enlarged scale.

Generally, the machine is organized as is a heeler of the well-known Lightning type. For the purpose of the present description, this old structure will be outlined but briefly. A frame 10 has, near its central portion, horizontal ways 12, in which may be slid from front to rear of the machine, and the reverse, a work-supporting jack 14, which may thus occupy a position clear of a die-block 16, to permit the operator to apply the work to the jack, or beneath said die-block in the nail-driving position. The die-block contains nail-holding passages 18 in which operate drivers 20 mounted upon a top-girt 22 extending between the upper extremities of side rods 24, 24 arranged to reciprocate in the frame.

At one side of the frame 10 upon a bracket 26 is supported a distributing mechanism 28, the general characteristics of which will be easily recognized, this supplying nails or other fasteners through tubes or conduits 30, one for each nail of a set to be driven, to corresponding sets of openings 32 in a block 34 carried by a loader-arm 36. The loader-arm is mounted to oscillate about one of the side rods 24 from a position in which a stop-projection 38 which it carries is in contact with a surface beneath the distributor, locating the loader-block in its nail-receiving position, to its opposite extreme of movement when a stop-projection 40 strikes a surface at the die-block. Here the block 34 is in its nail-delivering position.

Figure 7:
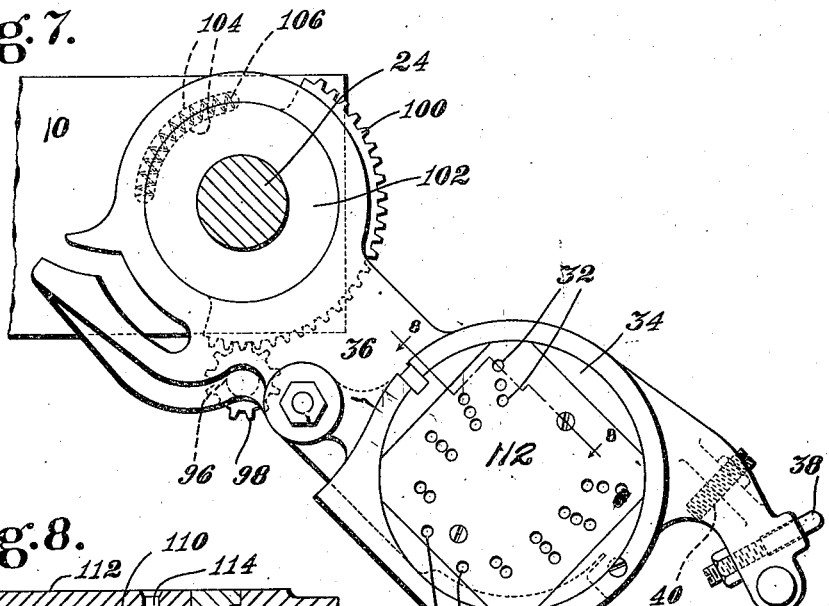
Fig. 7 shows the loader-arm in top plan.

A single die-block and similarly a single loader-block may be made to serve for all nailing designs in accordance with which the machine is to operate, by use of multiple blocks containing openings for all the designs and changing the drivers so that they correspond to the particular design employed. It has been found that reasonably satisfactory results may be obtained in heel-seat-nailing by employing one design for a plurality of sizes of shoes, and by this expedient the number of sets of block-openings has been reduced in the present instance to three. These are located as appears in Fig. 7 of the drawings showing the loader-block, the openings 18 of the die-block being placed in a like manner with relation to one another. It is not necessary to change the location of the nails at the rear of the heel for any of the shoe-sizes to be nailed. Consequently, a pair of openings 41, appearing at the lower left-hand portion of the loader-block, are utilized in all nailing operations, while of the next openings toward the breast of the heel, or to the right as viewed in Fig. 7, the inner serve for two groups of sizes and the outer the remaining group. In the remainder of the nail-locations, there is a different point in the design for each group to be nailed.

To expeditiously effect a rearrangement of the distributor-tubes upon a change of nailing, these are received at their lower extremities by terminal-sleeves 42, which sleeves are mounted to slide in slots 44 in a foot-plate 46. The foot-plate is held within a frame 48 supported at the lower portion of the distributor just above the plane of movement of the loader-arm, and is preferably removably retained in place by opposite spring-latches 50, 50. Movable upon the top of the foot-plate in opposite ways 52, 52 is an actuating plate, which is shown as having two sections 54, 54. The plate-sections are cut away at 56 over the pair of loader-block openings 32, which remain unchanged for all nailing, while at 58, 58 are slots extending in the direction of movement of the plate-sections, and which produce no effect upon the terminal sleeves which extend into them until adjustment of the sections is made for the third nailing design, thus leaving the sleeves unaltered for the first two. Springs 60, operating upon plungers 62, hold the terminal-tubes within these slots 58 at their inward limit of movement in the slots 44, until they are displaced against the expansion of the springs by contact of the inner extremities of the slots 58 with them. With the remainder of the terminal-tubes cooperate slots 64 formed in the plate-sections 54, which extend transversely of the slots in the foot-plate and upon movement of the sections cause a corresponding travel of the tube-terminals in directions determined by the angles of the slots in the foot-plate.

To effect the terminal-sleeve-adjusting movement of the plate-sections 54, there is journaled in the foot-plate a shaft 66, extending parallel to the plate-sections and having secured at its opposite extremities pinions 68, 68. With these pinions mesh rack-teeth 70 upon horizontal extensions 72, 72 from one of the plate-sections, while rack-teeth 74 upon depending side portions of the other plate-section are engaged by the opposite teeth of the pinions. Fast upon the forward end of the shaft 66 is an arm 78, by which the shaft may be rotated to the desired extent. To determine the angular movement of the shaft, and therefore the amount of travel of the actuating plate-sections, the arm has formed upon it an index-segment 80, in which are three peripheral depressions 82. Associated with these depressions may be numerals from 1 to 3, indicating the setting of the terminal-sleeves to which this movement of the arm 78 corresponds. To hold the arm 78 and actuating plate-sections in the adjusted position, any one of the depressions 82 may be engaged by a spring-pressed detent 84 arranged to reciprocate at the front of the foot-plate, and having a finger-piece 86 by which it may be drawn out of contact with the disk.

All sizes of shoes, the heel-seats of which are to be nailed, will fall within some one of the three designs indicated upon the segment 80. Therefore, in addition to applying to the top-girt of the machine the correctly arranged set of drivers 20 for the design which best suits the size he is to nail, the operator, if necessary, releases the arm from the detent and turns it to the group-number which will give the desired arrangement of distributor-tubes. This shifts the actuating plate-sections 54, and by the cam-effect of the slots 64 co-operating with the foot-plate slots 44 carries the terminal sleeves to the predetermined points at which they are in alinement with the set of openings 32 in the loader-block, also corresponding to the chosen design. If this change be from the first design to the second, there is no action by the plate-slots 58, these being ineffective until their inner ends strike the terminal sleeves upon a setting for the third design.

To carry the loader-block 34 from its nail-receiving position beneath the distributor to its nail-delivering position above the die-block, and to effect its return, it is connected to the jack 14 for oscillation as an incident to movement by the operator of the jack between the work-receiving and the operating positions. Carried horizontally upon the bottom of the jack is a rack 88 meshing with a pinion 90 secured upon the inner extremity of a horizontal shaft 92 journaled upon the frame 10. The shaft 92 is joined by bevel-gearing 94 to a vertical shaft 96 rotatable upon the frame, this latter shaft being connected by a pinion 98 with a segment 100 formed upon a short sleeve 102 surrounding the side rod 24 beneath the loader-arm. Arranged to turn within the arm, between it and the side-rod, is an upwardly extending portion of the sleeve 102, and in this extension and in the arm are normally registering elongated depressions 104, 104. In these depressions is seated a helical spring 106, which is in contact with the opposite ends of the depressions and may be compressed by relative angular movement of the sleeve and the loader arm.

Assuming the jack to be in its inner position beneath the die-block, the gearing connecting this to the loader-arm is so arranged that the loader-block will at this time be beneath the foot-plate 46, ready to receive a charge of nails therefrom, being alined by the contact of its stop-projection 38. There having been supplied from the distributor-tubes to the openings 32 and 41 a load of nails, when the operator draws out the jack to remove the shoe the heel-seat of which has been nailed, the gearing oscillates the loader-arm to its delivery position, as fixed by the projection 40, over the die-block, the openings 18 of which receive the nails for the succeeding operation. If the limits of movement of the jack and loader-arm do not exactly correspond, the spring 106 permits a yield, being compressed in a counter-clockwise direction if there is excessive movement of the jack when the stop-projection 38 of the loader-arm is in contact with the distributor, and in a clockwise direction when the projection 40 engages the die-block.

Figure 8:
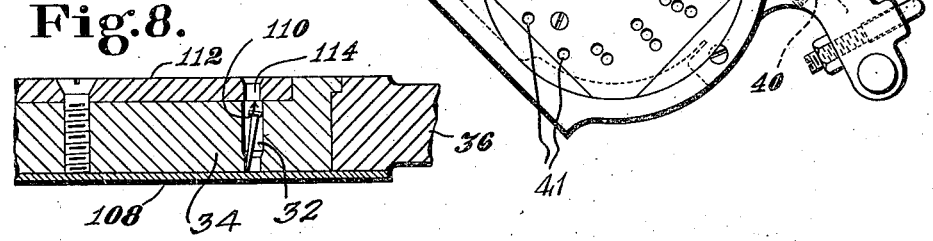
Fig. 8 is a vertical section on the line 8—8 of Fig. 7.
Figure 9:
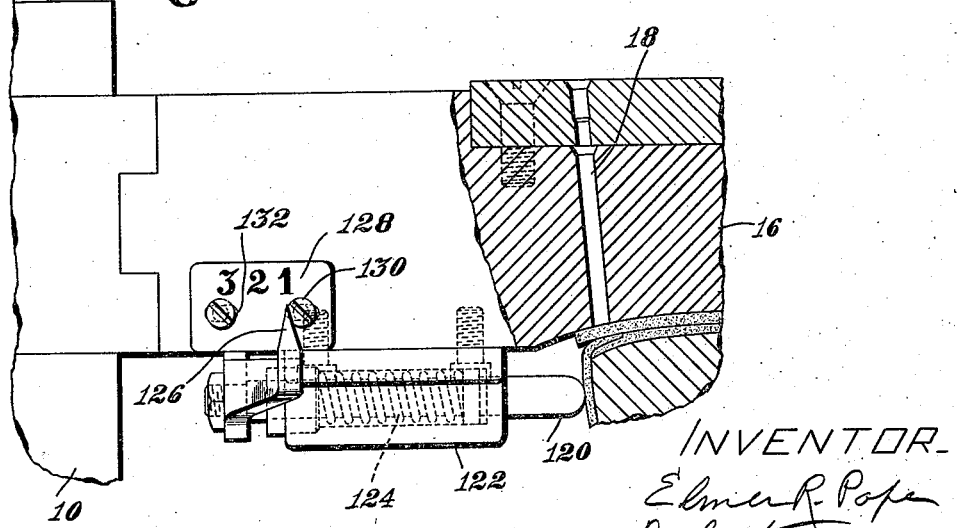
Fig. 9 is an enlarged detail in front elevation of the die-block with the associated gaging and indicating means, a portion being in section.

To prevent the jar of contact between the loader-arm-stops and the co-operating surfaces from throwing the nails from the passages 32 and 41, in which they are supported during their transfer by the usual shutter 108 each passage above the nail-holding chamber has an overhanging annular shoulder 110, with which the head of the nail, resting, as is illustrated in Fig. 8 of the drawings, against the side of the holding chamber, will contact and be retained against upward displacement from the passage. This overhang may be furnished by a plate 112 situated in a recess in the upper face of the loader-block, and having receiving openings 114 of less diameter than the nail-holding chambers and preferably concentric therewith. The openings 114 are of sufficient width to readily admit the nails, but, as already pointed out, prevent, by contact at 110, the jarring of the nails from the passages.

The rear portions of outsoles when the heel-seat-nailing is done are so large and irregular as to prevent the operator from accurately determining the relation of the rand-crease, as is indicated by the adjacent counter-portion of the upper, to the die-block openings 18. He is therefore hampered in deciding when the angle of the shoe is such as to symmetrically locate the nails with reference to the opposite sides of the heel-seat. The only aid in this direction of which I am aware is the very crude and unsatisfactory one furnished by vertical lines incised upon the front edge of the die-block at the opposite sides of the nail-passages. To enable the operator to fix very exactly the position of the work, there is mounted beneath the die-block, at each side of the passages 18, a gage-member consisting of a plunger 120 movable horizontally in a casing 122 against a spring 124 encircling the stem of the plunger within the casing. The inner adjacent extremities of the two plungers are situated opposite the counter-portion of a jacked shoe when in the nailing position, and at points just below the rand-crease. Upon each plunger-stem, outside of its casing, is fixed an index-finger 126 movable by the plunger over a scale 128 carried upon the front of the die-block. Each scale bears the numerals 1, 2, 3, reading from the inner end outwardly. The scales are shown as adjustably secured upon the die-block by screws 130 passing through horizontal slots 132, and are so placed that when the jacked shoe is thrust between the plungers and is turned to properly present its heel-seat to the die-block passages for nailing, the index-fingers will be more or less exactly alined with the scale-number of the group in which falls the size of shoe being operated upon. The same condition is true for each of the three groups, and if the fingers do not both coincide with the correct number, the operator turns the shoe upon the jack in a horizontal plane until this agreement is obtained, and then proceeds with the nailing of the heel-seat.

The organization by which the loader-arm is moved, together with the retaining means for nails in the loader-block-openings, and the gage devices by which the correct angular position of the work is determined, disclosed herein but not claimed, are made the subject of a divisional application in my name, Serial No. 207,234, filed July 20, 1927.

Having described my invention, what I claim as new and desire to secure by Letters Patent of the United States is:

1. In an attaching machine, a plurality of groups of fastener-conduits and movable means individual to each group for varying the position of such group with relation to the associated group.

2. In an attaching machine, a plurality of groups of fastener-conduits, movable means individual to each group for varying the potion of such group with relation to the associated group, and means arranged to move the position-varying means simultaneously.

3. In an attaching machine, a plurality of fastener-conduits, a mounting member having an opening to receive and guide each conduit, and means arranged to move the conduits in the openings.

4. In an attaching machine, a plurality of fastener-conduits, a mounting member having an elongated opening to receive and guide each conduit, and means arranged to move the conduits to different extents along the openings.

5. In an attaching machine, a plurality of fastener-conduits each having a terminal-portion, a mounting member having openings to receive the terminal-portions, and movable adjusting members each provided with openings co-operating with the terminal-portions.

6. In an attaching machine, a plurality of groups of fastener-conduits, each conduit having a terminal-portion, a mounting member provided with openings to receive the terminal-portions, and a movable adjusting member for each group of conduits, each adjusting member having openings co-operating with the terminal-portions belonging to its group, which terminal-portions are disposed in the corresponding openings of the mounting member.

7. In an attaching machine, a plurality of groups of fastener-conduits, each conduit having a terminal-portion, a mounting member provided with openings to receive the terminal-portions, a movable adjusting member for each group of conduits, each adjusting member having openings co-operating with the terminal-portions belonging to its group, and means for moving said adjusting members simultaneously in opposite directions.

8. In an attaching machine, a tube-holder, fastener-tubes carried thereby, a foot-plate having an opening receiving each tube, and an adusting plate having openings co-operating with the tube disposed in the foot-plate openings.

9. In an attaching machine, a tube-holder, fastener-tubes carried thereby, a foot-plate having an opening receiving each tube, an adjusting plate having openings co-operating with the tubes disposed in the foot-plate openings, and means for determining the position of the adjusting plate.

10. In an attaching machine, a tube-holder, fastener-tubes carried thereby, a foot-plate having an elongated opening receiving each tube, and an adjusting plate having elongated openings co-operating with the tubes disposed in the foot-plate openings and extending at different angles with respect to said foot-plate openings.

11. In an attaching machine, a tube-holder, fastener-tubes carried thereby, a foot-plate having an opening receiving each tube, and adjusting plates having openings co-operating with different groups of tubes disposed in the corresponding foot-plate openings.

12. In an attaching machine, a tube-holder, fastener-tubes carried thereby, a foot-plate having an opening receiving each tube, adjusting plates having openings co-operating with different groups of tubes disposed in the corresponding foot-plate openings, and gearing connecting said adjusting plates.

13. In an attaching machine, a tube-holder, fastener-tubes carried thereby, a foot-plate having an opening receiving each tube, adjusting plates having openings co-operating with the tubes disposed in the foot-plate openings, gearing connecting said adjusting plates, and index means for locking said gearing.

In testimony whereof I have signed my name to this specification.

ELMER R. POPE.